(12) United States Patent
Szor

(10) Patent No.: US 7,325,185 B1
(45) Date of Patent: Jan. 29, 2008

(54) HOST-BASED DETECTION AND PREVENTION OF MALICIOUS CODE PROPAGATION

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 543 days.

(21) Appl. No.: 10/633,907

(22) Filed: Aug. 4, 2003

(51) Int. Cl.
G06F 11/00 (2006.01)

(52) U.S. Cl. .................. 714/799; 714/38; 713/188

(58) Field of Classification Search ............. 714/799, 714/38; 713/188, 200; 726/22, 24; 709/232
See application file for complete search history.

(56) References Cited

U.S. PATENT DOCUMENTS

| | | | |
|---|---|---|---|
| 2,930,199 A | | 3/1960 | Jarund |
| 3,188,815 A | | 6/1965 | Schuermann et al. |
| 3,837,258 A | | 9/1974 | Williams |
| 4,194,858 A | | 3/1980 | Evans |
| 4,284,379 A | | 8/1981 | Chaiko |
| 4,313,696 A | | 2/1982 | Horten |
| 4,314,778 A | | 2/1982 | Cantrel |
| 4,502,818 A | | 3/1985 | Elders |
| 4,659,258 A | | 4/1987 | Scott |
| 5,096,335 A | | 3/1992 | Anderson et al. |
| 5,192,146 A | | 3/1993 | Landsberg |
| D349,120 S | | 7/1994 | Landsberg |
| 5,387,060 A | | 2/1995 | Locotos |
| D362,448 S | | 9/1995 | Landsberg |
| 5,649,790 A | | 7/1997 | Mergen et al. |
| 5,889,943 A | * | 3/1999 | Ji et al. ............... 726/22 |
| 5,931,606 A | | 8/1999 | Karlsen |
| 6,368,021 B1 | | 4/2002 | Strong et al. |
| 6,461,084 B1 | | 10/2002 | Stuart |
| 6,536,993 B2 | | 3/2003 | Strong et al. |
| 6,785,732 B1 | * | 8/2004 | Bates et al. ............... 709/232 |

(Continued)

FOREIGN PATENT DOCUMENTS

CA 2128989 1/1995

(Continued)

OTHER PUBLICATIONS

Williamson, Matthew M., "Throttling Viruses: Restricting propagation to defeat malicious mobile code", Hewlett-Packard Company, unnumbered abstract page and pp. 1-6 [online]. Retrieved on Sep. 2, 2003. Retrieved from the Internet: <URL:http://www.hpl.hp.com/techreports/2002/HPL-2002-172.pdf>.

Primary Examiner—Guy Lamarre
Assistant Examiner—Fritz Alphonse
(74) Attorney, Agent, or Firm—Gunnison, McKay & Hodgson, L.L.P.; Lisa A. Norris

(57) ABSTRACT

Requests issuing on a host computer are intercepted and stalled prior to sending to target computer systems. The requests are analyzed to determine whether they are suspicious. Requests determined to be suspicious are added as request entries to a request database. Each time a request entry is added to the request database, a determination is made whether malicious code activity is detected on the host computer system. Upon a determination that malicious code activity is detected, a notification of the malicious code detection is generated and protective actions are implemented, such as terminating the request. Requests not determined to be suspicious or to indicate malicious code activity are released for sending to the target computer systems.

18 Claims, 8 Drawing Sheets

U.S. PATENT DOCUMENTS

| | | | |
|---|---|---|---|
| 6,802,028 B1* | 10/2004 | Ruff et al. | 714/38 |
| 6,851,057 B1* | 2/2005 | Nachenberg | 726/24 |
| 6,976,066 B1* | 12/2005 | Mouhanna et al. | 709/223 |
| 7,080,408 B1* | 7/2006 | Pak et al. | 726/24 |
| 2003/0120935 A1* | 6/2003 | Teal et al. | 713/188 |
| 2003/0159090 A1* | 8/2003 | Wray et al. | 714/38 |
| 2004/0158725 A1* | 8/2004 | Szor | 713/188 |
| 2004/0250124 A1* | 12/2004 | Chesla et al. | 713/201 |
| 2005/0086499 A1* | 4/2005 | Hoefelmeyer et al. | 713/188 |
| 2005/0108562 A1* | 5/2005 | Khazan et al. | 713/200 |

FOREIGN PATENT DOCUMENTS

| | | |
|---|---|---|
| CA | 2180878 | 1/1998 |
| CA | 2228365 | 7/1998 |
| CA | 2276771 | 10/1999 |
| WO | WO 90/04085 | 4/1990 |
| WO | WO 94/17283 | 8/1994 |

* cited by examiner

FIG. 3

| REQUEST ID | STANDARDS FLAG | MODULE FLAG | MODULE ID | IP ADDRESS | TIME | COUNTER VALUE |
|---|---|---|---|---|---|---|
| A | 0 | 0 | | 1.160.10.125 | 10:03:03:09:08:02:01 | 1 |
| B | 0 | 1 | M1 | 1.160.10.240 | 10:03:03:09:08:02:11 | 1 |
| C | 1 | 0 | | 1.160.10.481 | 10:03:03:09:08:02:21 | 1 |
| B | 0 | 1 | M2 | 1.160.10.240 | 10:03:03:09:08:02:31 | 2 |
| B | 0 | 1 | M2 | 1.160.10.240 | 10:03:03:09:08:02:41 | 3 |
| B | 0 | 1 | M2 | 1.160.10.240 | 10:03:03:09:08:02:51 | 4 |
| B | 0 | 1 | M2 | 1.160.10.240 | 10:03:03:09:08:03:01 | 5 |
| C | 1 | 0 | | 1.160.10.481 | 10:03:03:09:08:03:21 | 2 |

HOST-BASED DETECTION AND PREVENTION OF MALICIOUS CODE PROPAGATION

BACKGROUND OF THE INVENTION

1. Field of the Invention

The present invention relates to the protection of computer systems. More particularly, the present invention relates to detection and prevention of malicious code propagation, such as computer worm propagation.

2. Description of the Related Art

Some malicious code, such as the CodeRed and Nimda computer worms, exploit vulnerabilities of a host computer system and propagate from the host computer system to other computer systems at a very fast rate. Due to the fast propagating nature of these computer viruses, detection and prevention measures are typically developed and implemented after the computer virus has infected and damaged large numbers of computer systems.

SUMMARY OF THE INVENTION

In accordance with the present invention, requests issuing on a host computer are intercepted and stalled prior to sending to target computer systems. The requests are analyzed to determine whether they are suspicious. Requests that are determined to be suspicious are added as request entries to a request database. Alternatively, requests that are not determined to be suspicious are released for sending to the target computer systems.

Each time a request entry is added to the request database a determination is made whether or not malicious code activity is detected on the host computer system. Upon a determination that malicious code activity is not detected, the request is released for sending to the target computer system. Alternatively, upon a determination that malicious code activity is detected, a notification of the malicious code activity detection is generated and protective actions are implemented, such as terminating the request.

Embodiments in accordance with the present invention are best understood by reference to the following detailed description when read in conjunction with the accompanying drawings.

BRIEF DESCRIPTION OF THE DRAWINGS

FIG. 3 illustrates an example of a request database in accordance with one embodiment of the present invention;

Common reference numerals are used throughout the drawings and detailed description to indicate like elements.

DETAILED DESCRIPTION

Figure 1:
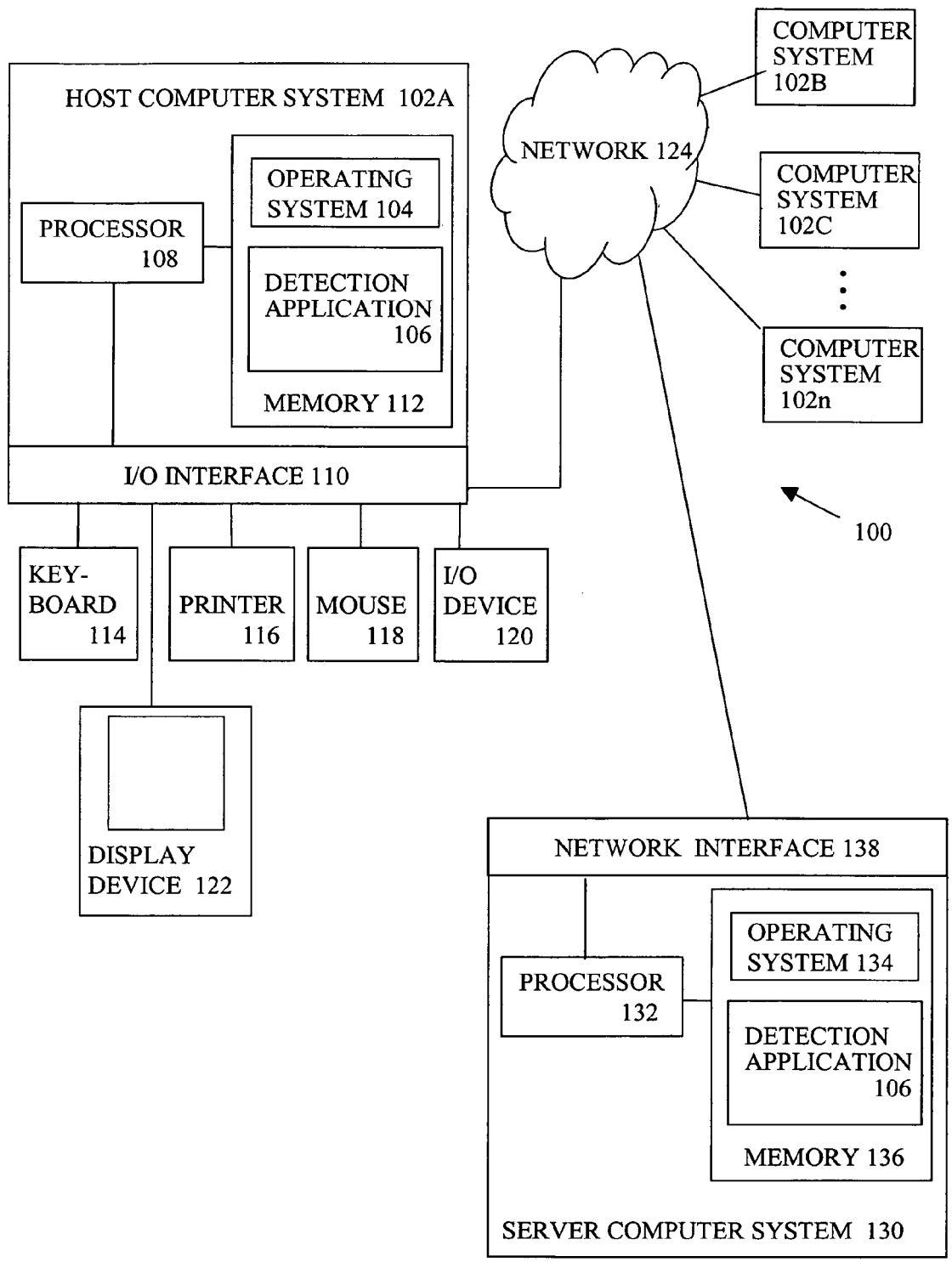
FIG. 1 illustrates a diagram of a client-server system including a detection application executing on a host computer system in accordance with one embodiment of the present invention.

In accordance with the present invention, a detection application executing on a host computer system intercepts and stalls a request on the host computer system prior to sending the request to a target computer system. The request is analyzed and a determination is made whether the request is suspicious. In one embodiment, a request that is determined to be suspicious is entered into a request database as a request entry. Alternatively, upon a determination that the request is not suspicious, a request entry is not added to the request database, and the request is released for sending to the target computer system.

In one embodiment, each time a request entry is made to the request database, a determination is made whether malicious code activity is detected on the host computer system based upon the request entry. In one embodiment, when a request entry occurs more than a threshold number of times in a specified time frame in the request database, it is determined that malicious code activity is detected.

Upon a determination that malicious code activity is detected, a notice is sent to a user, such as the user of the host computer system and/or other users, advising that malicious code activity is detected on the host computer system, and protective actions, such as termination of the request, are implemented. Alternatively, upon a determination that malicious code activity is not detected, the request is released for sending to the target computer system. In this manner, malicious code is rapidly detected, permitting implementation of protective actions.

Herein, malicious code is defined as any computer program, module, set of modules, or code that enters a computer system without an authorized user's knowledge and/or without an authorized user's consent. Further herein, malicious code activity is defined as any activity that is indicative of malicious code.

Embodiments in accordance with the present invention detect features of requests that are associated with some malicious code, such as computer worms, and are unlikely to occur with requests generated during the course of conventional request generation from a host computer system, such as conventional web browsing.

For example, typically, when a user on a host computer system is web browsing, the user performs a search and receives a listing of links to selected pages on a target computer system. The user selects a link that initiates a request, such as hypertext transfer protocol (HTTP) GET request, from the host computer system to a target computer system, such as a server, specifying a selected page hosted on the target computer system. The target computer system, e.g., the server, sends back an answer to the host computer system request, such as the requested page.

Some users also web browse by first sending an indexing request to a target computer system. For example, a user can send an HTTP GET ROOT request from a host computer system to a target computer system, such as a server. The target computer system, e.g., the server, sends back an answer to the host computer system, such as an index page. The user can then send a more specific request from the host computer system to the target computer system requesting a particular page listed in the index.

Thus, in conventional web browsing, requests are typically issued for specific pages hosted on a target computer system. Further, the same requests are typically not repeatedly sent to different computer systems within a short time frame.

Differently from the above described conventional web browsing request patterns, some malicious code, such as the CodeRed and Nimda computer worms, generate requests to specific processing modules of a target computer system that are vulnerable to attack, such as through buffer or heap overflow techniques. Once the computer worm has compromised a host computer system, it can then select new target computer systems and spread to them. In spreading to new target computer systems, the computer worm typically attempts to propagate quickly by generating repeated requests to a large number of different target computer systems in a short time frame.

Some computer worms simply generate repeated requests directed at the same vulnerable processing module, e.g., a processing module vulnerable to attack, to a large number of different target computer systems in anticipation of accessing a target computer system having the particular vulnerable processing module. If a target computer system does not have the particular vulnerable processing module, the target computer system typically either does not answer the request or returns an error message. Some error messages identify the error and provide information as to the identity of the target computer system, such as the target computer system type, the communications protocol utilized by the target computer system, and/or the operating system supporting the target computer system. Simpler computer worms typically do not utilize information provided in the error message, but other more complex computer worms utilize the information in the error message.

Other more complex computer worms utilize information in an error message received back from a target computer system, if any, to re-direct an attack on that target computer system. For example, similar to the simpler computer worms, a more complex computer worm generates an initial request directed to a particular vulnerable processing module in anticipation of accessing a target computer system having the particular vulnerable processing module. However, if a target computer system does not have the vulnerable processing module and sends an error message back to the host computer system, the other more complex computer worm utilizes the information in the error message to generate another request to the target computer system directed to a vulnerable processing module specific to the target computer system.

Still other computer worms send a syntaxically incorrect request, e.g., a request that does not meet selected communication standards, such as Request For Comments (RFC) standards, to a target computer system in anticipation of receiving an error message with information the computer worm utilizes to direct an attack on the target computer system. The target computer system receiving the syntaxically incorrect request typically either does not respond or sends an error message back to the host computer system. Upon receipt of the error message, the computer worm utilizes the information provided in the error message to send another request to the target computer system, this time directed to a vulnerable processing module specific to the target computer system.

Thus, a host computer system infected with some malicious code, such as a computer worm, exhibits activity that includes repeated transmission of a request to a large number of target computer systems, generally within a short time frame. Further, the requests are often directed to vulnerable processing modules. Additionally, the requests are sometimes not in accordance with communications standards, such as RFC standards, in order to prompt an error message response from a target computer system. This error message is utilized by some malicious code to refine an attack on the target computer system.

FIG. 1 illustrates a diagram of a client-server system 100 including a detection application 106 executing on a host computer system 102A in accordance with one embodiment of the present invention. Host computer system 102A can be a stand-alone computer system, such as a personal computer or workstation, as illustrated in FIG. 1 by host computer system 102A. Host computer system 102A can also be configured as part of client-server system 100 also illustrated in FIG. 1 in which host computer system 102A interacts with a server computer system 130 via a network 124, such as the Internet.

Detection application 106 is described herein as executing on host computer system 102A, e.g., a first computer system. However, in light of this disclosure, those of skill in the art will understand that the description is applicable to client-server system 100 and computer systems 102B-102n, interacting simultaneously or serially with server computer system 130, e.g., a second computer system.

Host computer system 102A, sometimes called a client or user device, typically further includes a processor 108, an input/output (I/O) interface 110, an operating system 104, and a memory 112. In one embodiment, memory 112 includes a main memory, as well as any supplemental memories, and includes executable areas, data storage areas, and any memory areas needed by host computer system 102A (including operating system 104).

Host computer system 102A may additionally include: standard input devices, such as a keyboard 114 and a mouse 118; standard output devices, such as a printer 116 and a display device 122; as well as one or more standard input/output (I/O) devices 120, such as a compact disk (CD) or DVD drive, floppy disk drive, or other digital or waveform port for inputting data to and/or outputting data from host computer system 102A.

In one embodiment, detection application 106 is loaded into memory 112 of host computer system 102A via an I/O device 120, such as from a CD or floppy disk containing detection application 106. In other embodiments, such as client-server embodiments, detection application 106 can be stored on server computer system 130 and downloaded to host computer system 102A via network 124.

As illustrated, server computer system 130 of client-server system 100 is coupled to host computer system 102A by network 124. Network 124 can be any network or network system that is of interest to a user.

Server computer system 130 typically includes: a network interface 138 for communicating with network 124; a processor 132; an operating system 134; and a memory 136. As earlier described, in some embodiments, detection application 106 is stored in memory 136 for downloading to host computer system 102A.

Server computer system 130 can further include a display, a keyboard, a mouse, and other input/output (I/O) devices not shown. As shown in FIG. 1, in one embodiment, a plurality of host computer systems 102B-102n similar to host computer system 102A are coupled to host computer system 102A and server computer system 130 by network 124. In one embodiment, any, some or all of host computer systems 102A-102n are also servers.

The particular type of and configuration of host computer system 102A, computer systems 102B-102n, and server computer system 130 are not essential to this embodiment of the present invention. In various embodiments, network interface 138 and I/O interface 110 include analog modems, digital modems, or a network interface card.

Figure 2:
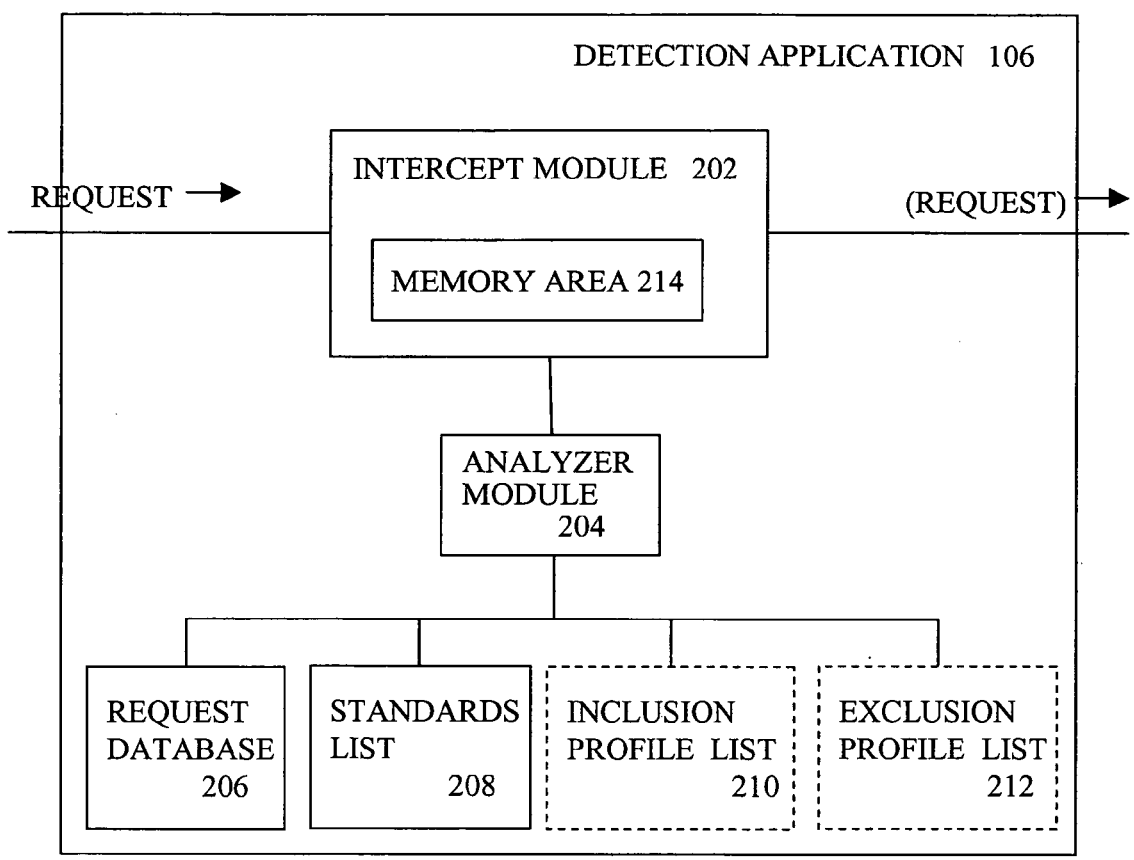
FIG. 2 illustrates a functional diagram of the detection application of FIG. 1 in accordance with one embodiment of the present invention.

FIG. 2 illustrates a functional diagram of detection application 106 in accordance with one embodiment of the present invention. As illustrated in FIG. 2, in one embodiment, detection application 106 includes: an intercept module 202; an analyzer module 204; a request database 206; a standards list 208; an optional inclusion profile list 210; an optional exclusion profile list 212; and a memory area 214. In the present embodiment, memory area 214 is illustrated as included in intercept module 202, however, in other embodiments, memory area 214 is external to intercept module 202.

In one embodiment, intercept module 202 intercepts a request on host computer system 102A and stalls the request in memory area 214. Analyzer module 204 utilizes data in standards list 208 and, optionally, inclusion profile list 210 and/or exclusion profile list 212 to determine whether the request is suspicious.

In one embodiment, upon a determination that the request is suspicious, analyzer module 204 generates a request entry representative of the request and enters the request entry in request database 206. Alternatively, upon a determination that the request is not suspicious, the request is released from memory area 214 for sending to the target computer system.

In one embodiment, each time a request entry is made to request database 206, analyzer module 204 determines whether malicious code activity is detected on host computer system 102A based upon the request entry. Upon a determination that malicious code activity is detected, analyzer module 204 generates a notice advising that malicious code activity is detected on host computer system 102A, and implements protective actions, such as terminating the request.

In one embodiment, request database 206 includes request entries representative of requests determined to be suspicious. Request database 206 is further described herein with reference to FIG. 3.

FIG. 3 illustrates an example of request database 206 in accordance with one embodiment of the present invention. As illustrated in FIG. 3, in one embodiment, request database 206 includes one or more fields for including data associated with a request, such as an HTTP GET request, determined to be suspicious.

Referring now to FIGS. 2 and 3 together, in one embodiment, request database 206 includes a request ID field 302; a standards flag field 304; a module flag field 306; a module ID field 308; an IP address field 310; a time field 312; and, a counter value field 314. In the present embodiment, request ID field 302 includes a request ID representative of the request. In one embodiment, the request ID is a value, such as a value generated by executing an MD5 hash algorithm on the request, e.g., an MD5 hash.

Standards flag field 304 includes a standards flag value indicating whether or not a request meets one or more selected standards in standards list 208. In one embodiment, the standards flag value is a value, such as a one (1) or a zero (0). For example, request entry 320 includes a standards flag value of "1" in standards flag field 304 indicating the associated request identified as "C" does not meet one or more selected standards in standards list 208.

Module flag field 306 includes a module flag value indicating whether or not a request includes a module, such as vulnerable processing module, that matches an inclusion profile entry in inclusion profile list 210. In one embodiment, the module flag value is a value, such as a one (1) or a zero (0). For example, request entry 318 includes a module flag value of "1" in module flag field 306 indicating the associated request identified as "B" matches an inclusion profile entry in inclusion profile list 210.

Module ID field 308 includes data indicating the particular processing module, such as a vulnerable processing module, that matches an inclusion profile entry in inclusion profile list 210, if any. In one embodiment the data is the vulnerable processing module name, or a representative identifier of the module name, such as an MD5 hash of the vulnerable processing module name. For example, request entry 318 includes the data "M1" in module ID field 308 indicating the associated request identified as "B" includes vulnerable processing module "M1" that matches an inclusion profile entry in inclusion profile list 210.

IP address field 310 includes the IP address of the target computer system to which the request is addressed. For example, request entry 318 includes the IP address "1.160.10.240".

Time field 312 includes data indicating a time, such as a time stamp, associated with the request. For example, request entry 318 includes the time "10:03:03:09:08:02:11".

Counter value field 314 includes a counter value associated with each request entry. For example, request entry 316 has a counter value of "1", while request entry 322 has a counter value of "2". In one embodiment, a counter value for a most recent request entry is generated based on the cumulative number of matching earlier request entries in request database 206 occurring in a specified time frame. In other embodiments, a counter value for a most recent request entry is generated differently.

Although one embodiment of request database 206 is illustrated and described herein, in other embodiments, fewer, more, or different fields in request database 206 are possible, such as a port field identifying the port that a request is to be output from host computer system 102A.

Referring more particularly to FIG. 2, in one embodiment, standards list 208 includes selected standards utilized in evaluating whether a request is suspicious. In one embodiment, selected syntax standards, such as Request For Comments (RFC) standards, are included in standards list 208.

In some embodiments, optional inclusion profile list 210 is utilized in determining whether a request is suspicious. In one embodiment, optional inclusion profile list 210 includes inclusion profile entries representative of request parameters, such as vulnerable processing module identifiers. Optional inclusion profile list 210 is further described herein with reference to FIG. 4.

Figures 4, 5:
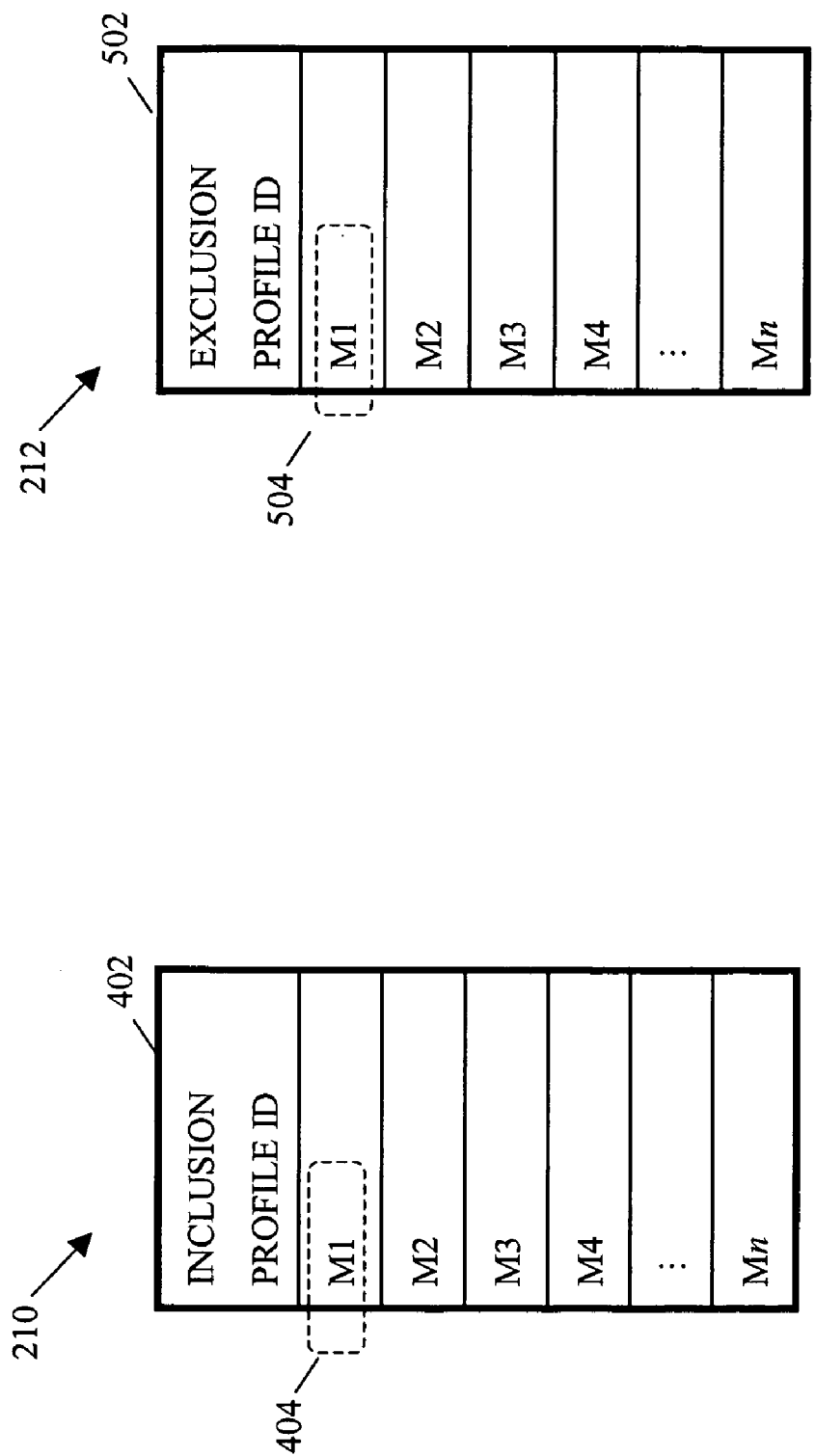
FIG. 4 illustrates an example of an inclusion profile list in accordance with one embodiment of the present invention.
FIG. 5 illustrates an example of an exclusion profile list in accordance with one embodiment of the present invention.

FIG. 4 illustrates an example of inclusion profile list 210 in accordance with one embodiment of the present invention. Referring now to FIGS. 2, 3, and 4 together, in one embodiment, inclusion profile list 210 includes a listing of inclusion profile entries, such as an inclusion profile entry 404, utilized in determining whether a request is suspicious. In one embodiment, each inclusion profile entry includes an inclusion profile ID 402 representative of a particular vulnerable processing module, such as a particular vulnerable CGI or Active X module name. In one embodiment, inclusion profile ID 402 is a hash, such as an MD5 hash, of the particular vulnerable processing module name.

Referring more particularly again to FIG. 2, in some embodiments, optional exclusion profile list 212 is utilized in determining whether a request is suspicious. In one embodiment, exclusion profile list 212 is used to exclude false positives, e.g., those requests that would be determined to be suspicious, yet for various reasons, such as local processing patterns, are defined as not suspicious. Optional exclusion profile list 212 is further described herein with reference to FIG. 5.

FIG. 5 illustrates an example of exclusion profile list 212 in accordance with one embodiment of the present invention. Referring now to FIGS. 2, 3, 4, and 5 together, in one embodiment, exclusion profile list 212 includes a listing of exclusion profile entries, such as an exclusion profile entry 504, to exclude from a determination as suspicious, e.g., to determine as not suspicious.

In one embodiment, each exclusion profile entry includes an exclusion profile ID 502 representative of a particular vulnerable processing module, such as a particular vulnerable CGI or Active X module name, that is to be determined as not suspicious. In some embodiments, exclusion profile ID 502 is representative of a syntaxically incorrect request which is to be determined as not suspicious. In one embodiment, exclusion profile ID 502 is a hash, such as an MD5 hash, of the particular vulnerable processing module name or the syntaxically incorrect request.

Thus, using exclusion profile list 212, inclusion profile list 210, which may have been developed at a regional or global level, is selectively overridden to permit locally accepted requests, such as those containing a vulnerable processing module or a syntaxically incorrect format, to not be determined as suspicious.

It will be understood by those of skill in the art that FIGS. 2-5 illustrate one example of detection application 106, and that other embodiments can utilize different configurations including fewer, more, or different modules, lists, databases, and/or memory areas.

Figure 6:
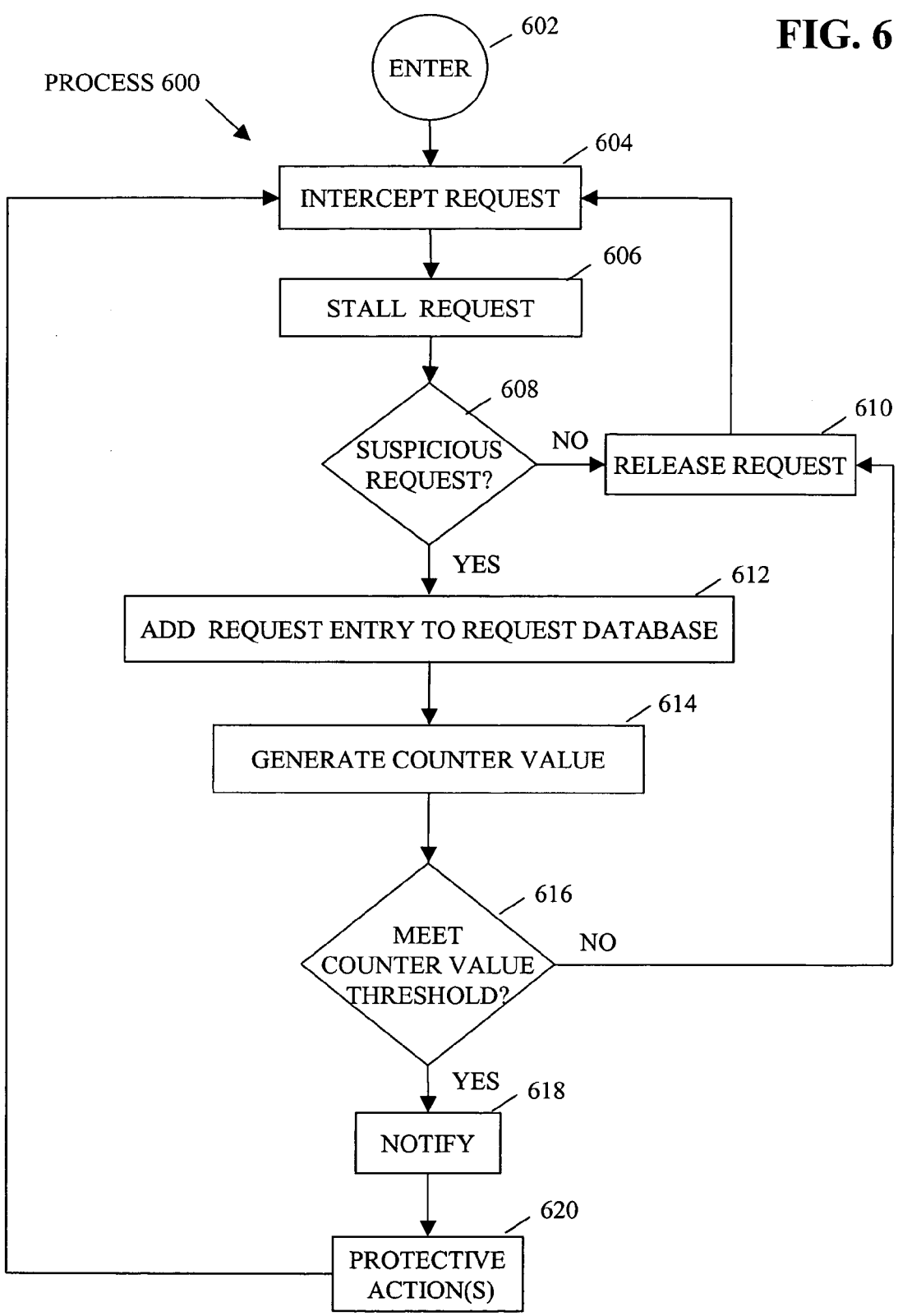
FIG. 6 illustrates a flow diagram of a host computer system process in accordance with one embodiment of the present invention.

FIG. 6 illustrates a flow diagram of a host computer system process 600 in accordance with one embodiment of the present invention. Referring now to FIGS. 1-6 together, in one embodiment, execution of detection application 106 by processor 108 results in the operations of process 600 as described below.

From an ENTER operation 602, flow moves to an INTERCEPT REQUEST operation 604.

In INTERCEPT REQUEST operation 604, a request issuing on a host computer system, such as host computer system 102A, is intercepted by intercept module 202 of detection application 106 prior to sending to a target computer system, such as computer system 102B. For example, in one embodiment, a hypertext transfer protocol (HTTP) GET request issuing on host computer system 102A is intercepted by intercept module 202 of detection application 106.

In one embodiment, a local proxy mechanism, such as an HTTP proxy, is utilized by intercept module 202 to intercept the HTTP GET request prior to sending to the target computer system. In one embodiment, the local proxy mechanism intercepts the HTTP GET request at the application level so that the content of the HTTP GET request is identifiable by analyzer module 204. Local proxy mechanisms, such as an HTTP proxy, are well-known to those of skill in the art and not further described herein. In other embodiments, other interception mechanisms that intercept requests at an application level prior to sending to a target computer system are utilized by intercept module 202. Upon interception of the request, from INTERCEPT REQUEST operation 604, flow moves to a STALL REQUEST operation 606.

In STALL REQUEST operation 606, the request is stalled, i.e., buffered, in a memory area, such as memory area 214. In one embodiment, memory area 214 is a circular buffer of finite size. Stalling the request permits analyzer module 204 to determine whether or not malicious code activity is detected on host computer system 102A before the request is released to the target computer system. Upon stalling the request, from STALL REQUEST operation 606, flow moves to a SUSPICIOUS REQUEST check operation 608.

In SUSPICIOUS REQUEST check operation 608, in one embodiment, analyzer module 204 evaluates the request and determines whether or not the request is suspicious. Herein, a suspicious request is defined as any request indicative of malicious code activity as determined in SUSPICIOUS REQUEST check operation 608 or as so defined in SUSPICIOUS REQUEST check operation 608. For example, as earlier described some malicious code activity includes repeated transmission of a request to a large number of target computer systems within a short time frame, a request directed to a vulnerable processing module, and/or a request not in accordance with communications standards, such as RFC standards. Various embodiments of SUSPICIOUS REQUEST check operation 608 are further described herein with reference to FIGS. 7-9.

Upon a determination that the request is not suspicious, e.g., the request is not indicative of malicious code activity, from SUSPICIOUS REQUEST check operation 608, flow moves to a RELEASE REQUEST operation 610.

In RELEASE REQUEST operation 610, a request not determined to be suspicious is released from memory area 214 and detection application 106 for sending to the target computer system, for example, computer system 102B. Upon releasing the request, from RELEASE REQUEST operation 610, flow moves to INTERCEPT REQUEST operation 604, which is performed as earlier described.

Referring again to SUSPICIOUS REQUEST check operation 608, alternatively, upon a determination that the request is suspicious, the request is further analyzed to determine whether malicious code activity is detected. In one embodiment, a determination whether or not malicious code activity is detected is performed as described in operations 612, 614, and 616. Thus, upon a determination that the request is suspicious, from SUSPICIOUS REQUEST check operation 608, flow moves to an ADD REQUEST ENTRY TO REQUEST DATABASE operation 612.

In ADD REQUEST ENTRY TO REQUEST DATABASE operation 612, a request entry representative of the request is generated by analyzer module 204 and added to request database 206. In one embodiment, the request entry includes a request identifier and other parameters associated with the request as earlier described with reference to FIGS. 2-5.

In one embodiment, the request entry is utilized in making a determination whether or not malicious code activity is detected, and in some embodiments, for further implementing protective actions. Upon addition of the request entry to request database 206, from ADD REQUEST ENTRY TO REQUEST DATABASE operation 612, flow moves to a GENERATE COUNTER VALUE operation 614.

In GENERATE COUNTER VALUE operation 614, the request entry is compared to earlier request entries in request database 206 to determine the number of earlier request entries within a specified time frame that match the request entry. In one embodiment, a look up function is performed on request database 206 to determine the number of earlier request entries within a specified time frame that match the request entry. In one embodiment, the data in time field 312 of request database 206 associated with a matching earlier request entry, e.g., the time, is utilized in determining whether the matching earlier request entry is within the specified time frame.

Upon a determination that the request entry matches an earlier request entry, analyzer module 204 generates a counter value for the request entry and associates the counter value with the request entry. In one embodiment, the counter value for the request entry is generated based on the cumulative number of matching earlier request entries in request database 206 occurring in the specified time frame incremented to include the request entry. For example, referring particularly to FIG. 3, request entry 322 receives a counter value of two (2) as an earlier matching request entry, e.g., request 320, within a specified time frame has a counter value of one (1).

Upon a determination that the request entry does not match an earlier request entry in request database 206, analyzer module 204 generates a counter value for the request entry, such as a value of one (1). For example, request entry 316 has no matching earlier request entries, e.g., is a first request entry of its type in request database 206, and thus has a counter value of one (1). Upon generation of the counter value for the request entry, from GENERATE COUNTER VALUE operation 614, flow moves to a MEET COUNTER VALUE THRESHOLD check operation 616.

In MEET COUNTER VALUE THRESHOLD check operation 616, analyzer module 204 compares the counter value associated with the request entry to a specified counter value threshold and determines whether the counter value threshold is met. In one embodiment, the counter value threshold is a threshold value stored in detection application 106, such as in analyzer module 204. In other embodiments, the counter value threshold is stored in a counter value threshold module in detection application 106 (not shown). In still other embodiments, the counter value threshold is stored with an associated entry in inclusion profile list 210 and/or standards list 208.

In some embodiments, the counter value threshold is user definable to accommodate particular user request patterns, such as web browsing patterns. In some embodiments, multiple counter value thresholds are utilized dependent upon the request entry. For example, a counter value threshold set for requests directed to extremely vulnerable processing modules associated with recent computer worm attacks can be set at a very low value. Differently, a counter value threshold set for requests associated with other computer worm attacks that are not directed to vulnerable processing modules but are repeatedly sent within a short time frame can be set at a higher value.

In one embodiment, a counter value associated with the request entry that is equal to or greater than the counter value threshold is determined to meet the counter value threshold, otherwise it is not determined to meet the counter value threshold. In other embodiments, other counter value threshold determination methods are possible. In one example, a counter value associated with the request entry that is greater than the specified counter value threshold is determined to meet the counter value threshold. In another example, a counter value associated with the request entry that is a specified percentage of the counter value threshold is determined to meet the counter value threshold.

Upon a determination that the counter value threshold is not met, the request entry, and thus the request, is not determinative of malicious code activity on host computer system 102A, and from MEET COUNTER VALUE THRESHOLD check operation 616, flow moves to RELEASE REQUEST operation 610, which is performed as earlier described.

Referring again to MEET COUNTER VALUE THRESHOLD check operation 616, alternatively, upon a determination that the counter value threshold is met, the request entry, and thus the request, is determinative of malicious code activity on host computer system 102A, and from MEET COUNTER VALUE THRESHOLD VALUE check operation 616, flow moves to a NOTIFY operation 618.

In NOTIFY operation 618, detection application 106 provides notification of the malicious code activity detection on host computer system 102A. In one embodiment, the user of host computer system 102A is notified of the malicious code activity detection. In various embodiments, the user is notified using any one of a number of techniques, such as by using a pop-up window, by writing to a file, and/or by logging the event. In some embodiments, detection application 106 provides notification of the malicious code activity detection to other individuals, such as a system administrator, as well as to other systems, such as an intrusion detection system (IDS). Upon notification of the malicious code activity, from NOTIFY operation 618, flow moves to a PROTECTIVE ACTION(S) operation 620.

In PROTECTIVE ACTION(S) operation 620, any, some, or all of a wide variety of protective actions are implemented. In one embodiment, the request stalled in memory area 214 is terminated and prevented from sending from host computer system 102A to the target computer system, for example, computer system 102B. In some embodiments, transmissions to and/or from host computer system 102A are shut down until user intervention is performed on host computer system 102A to remove or disable malicious code. Upon implementation of the protective actions, from PROTECTIVE ACTION(S) operation 620, flow moves to INTERCEPT REQUEST operation 604, which is performed as earlier described.

Figure 7:
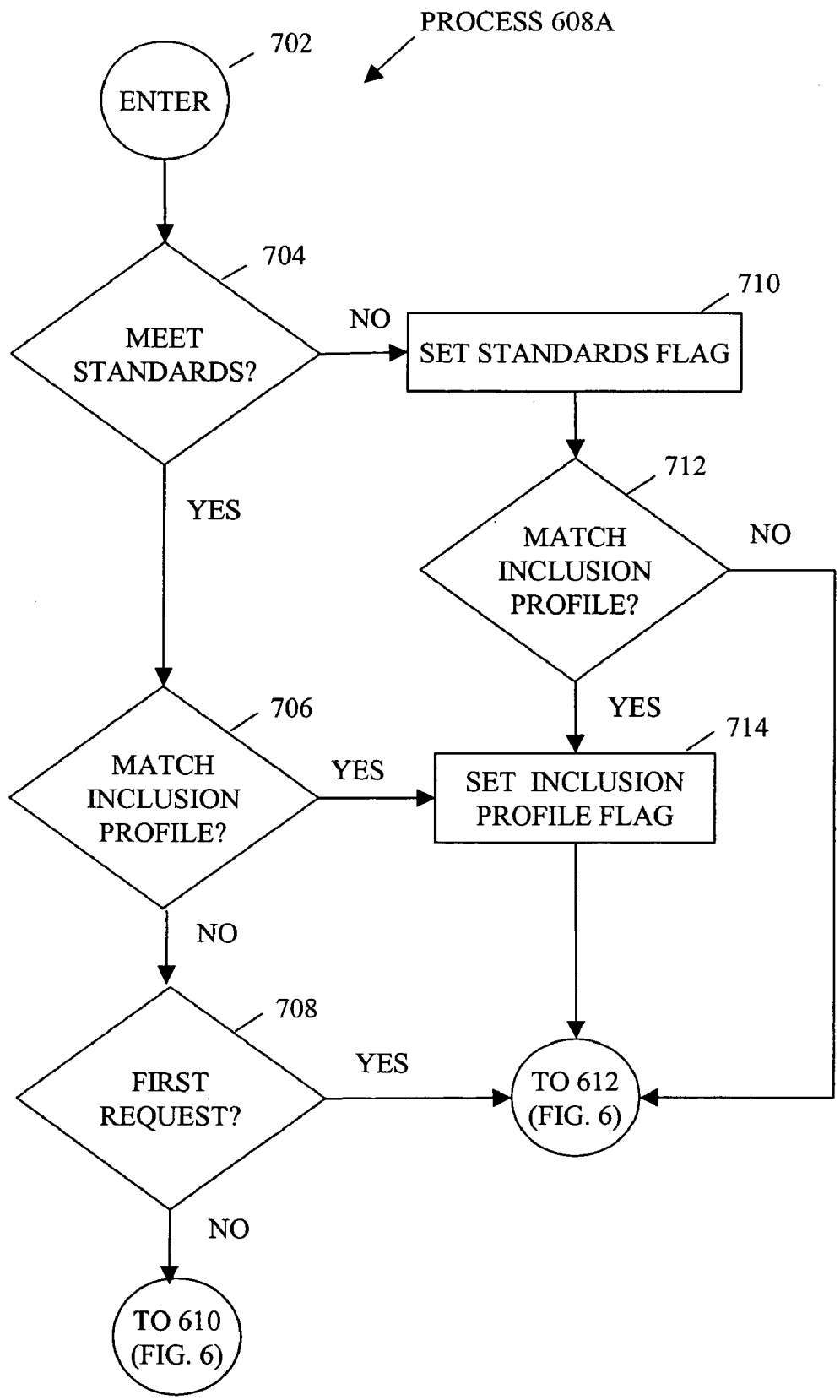
FIG. 7 illustrates a flow diagram of a host computer system process used in a SUSPICIOUS REQUEST check operation in accordance with one embodiment of the present invention.

FIG. 7 illustrates a flow diagram of a host computer system process 608A used in SUSPICIOUS REQUEST check operation 608 of process 600 in accordance with one embodiment of the present invention. Referring to FIGS. 1-7 together, in the present embodiment, a request entry is added to request database 206: (1) upon a determination that the request does not meet one or more selected standards in standards list 208; (2) upon a determination that the request matches an inclusion profile entry on inclusion profile list 212; or (3) upon a determination that the request is a first request. From an ENTER operation 702, flow moves to a MEET STANDARDS check operation 704.

In MEET STANDARDS check operation 704, analyzer module 204 analyzes the request to determine whether the request meets one or more selected standards, such as selected Request for Comments (RFC) syntax standards, in standards list 208.

In one embodiment, analyzer module 204 calculates any values, such as a hash algorithm value based on the request, needed to determine whether a selected standard is met. Upon a determination that the request does not meet the one or more selected standards, from MEET STANDARDS check operation 704, flow moves to a SET STANDARDS FLAG operation 710.

In SET STANDARDS FLAG operation 710, analyzer module 204 sets a standards flag indicating that it is determined that the request did not meet one or more selected standards in standards list 208. In one embodiment, the standards flag set by analyzer module 204 is utilized to generate the value in standards flag field 304 in request database 206, if a request entry is entered. Upon setting the standards flag, from SET STANDARDS FLAG operation 710, flow moves to a MATCH INCLUSION PROFILE check operation 712.

In MATCH INCLUSION PROFILE check operation 712, analyzer module 204 determines whether the request matches an inclusion profile entry listed in inclusion profile list 210. For example, assuming inclusion profile list 210 includes inclusion profile entries of vulnerable processing modules targeted by computer worms, matching an inclusion profile entry identifies the request being directed to a vulnerable processing module.

In one embodiment, to determine whether the request matches an inclusion profile entry, analyzer module 204 generates a request ID based on the request and compares the request ID to the inclusion profile IDs listed as entries in inclusion profile ID field 402 of inclusion profile list 210. In one embodiment, the request ID is generated utilizing the same formatting method utilized in generating the inclusion profile IDs, for example, a hashing algorithm, such as an MD5 hash.

In one embodiment, upon a determination that the request ID based on the request does not match an inclusion profile ID in inclusion profile list 210, the request does not match an inclusion profile entry. However, as the request does not meet the one or more standards in standards list 208, the request is determined to be suspicious, and from MATCH INCLUSION PROFILE check operation 712, flow exits process 608A and moves to ADD REQUEST ENTRY TO REQUEST DATABASE operation 612 of process 600 as earlier described.

Alternatively, upon a determination that the request ID based on the request matches an inclusion profile ID in inclusion profile list 210, it is determined that the request matches an inclusion profile entry, and from MATCH INCLUSION PROFILE check operation 712, flow moves to a SET INCLUSION PROFILE FLAG operation 714.

In SET INCLUSION PROFILE FLAG operation 714, analyzer module 204 sets an inclusion profile flag indicating that the request matches an inclusion profile entry in inclusion profile list 210. In one embodiment, the inclusion profile flag set by analyzer module 204 is utilized to generate the value in module flag field 306 in request database 206, if a request entry is entered. In some embodiments, analyzer module 204 further associates data with the inclusion profile flag identifying the particular inclusion profile entry matched in inclusion profile list 212, i.e., a module ID for a vulnerable processing module. As the request does not meet the one or more standards in standards list 208, and the request matches an inclusion profile entry, the request is determined to be suspicious, and from SET INCLUSION PROFILE FLAG operation 714, flow exits process 608A and moves to ADD REQUEST ENTRY TO REQUEST DATABASE operation 612 of process 600 as earlier described.

Referring again to MEET STANDARDS check operation 704, alternatively, upon a determination that the request meets the one or more selected standards in standards list 208, flow moves from MEET STANDARDS check operation 704, to a MATCH INCLUSION PROFILE check operation 706.

In MATCH INCLUSION PROFILE check operation 706, the request is compared to inclusion profile entries listed in inclusion profile list 210 as earlier described with reference to MATCH INCLUSION PROFILE check operation 712.

Upon a determination that the request does not match an inclusion profile entry, from MATCH INCLUSION PROFILE check operation 706, flow moves to a FIRST REQUEST check operation 708.

In FIRST REQUEST check operation 708, analyzer module 204 determines whether the request is a first request. In one embodiment, analyzer module 204 determines whether the request matches an earlier request entry in request database 206. In one embodiment, a request is determined to match an earlier request entry when the request ID generated by analyzer module 204 matches an earlier request ID of an earlier request entry. In one embodiment, the request IDs of earlier request entries and the request ID are formatted utilizing a hashing algorithm, such as an MD5 hash. In other embodiments, a request is determined to match an earlier request entry when the request ID and any, some, or all of the values or data in standards flag field 304, module flag field 306, and module ID field 308 match corresponding fields of an earlier request entry.

Upon a determination that the request matches an earlier request entry in request database 206, the request is not a first request. Thus, as the request meets the one or more standards in standards list 208, does not match an inclusion profile, and is not a first request, the request is not determined to be suspicious, and from FIRST REQUEST check operation 708, flow exits process 608A and moves to RELEASE REQUEST operation 610 of process 600 as earlier described.

Alternatively, upon a determination that the request does not match an earlier request entry in request database 206, the request is a first request. In the present embodiment, a first request is automatically defined as suspicious and used to establish a baseline request entry in request database 206 for the request, as well as to establish a time frame reference for any later matching request entries. Thus, as the request is determined to be suspicious, from FIRST REQUEST check operation 708, flow exits process 608A and moves to ADD REQUEST ENTRY TO REQUEST DATABASE operation 612 of process 600 as earlier described.

Referring again to MATCH INCLUSION PROFILE check operation 706, alternatively, upon a determination that the request ID based on the request matches an inclusion profile ID in inclusion profile list 210, the request matches an inclusion profile entry, and from MATCH INCLUSION PROFILE check operation 706, flow moves to SET INCLUSION PROFILE FLAG operation 714 as earlier described. As the request meets the one or more standards in standards list 208, but matches an inclusion profile entry, the request is determined to be suspicious, and flow exits process 608A and moves to ADD REQUEST ENTRY TO REQUEST DATABASE operation 612 of process 600 as earlier described.

Figure 8:
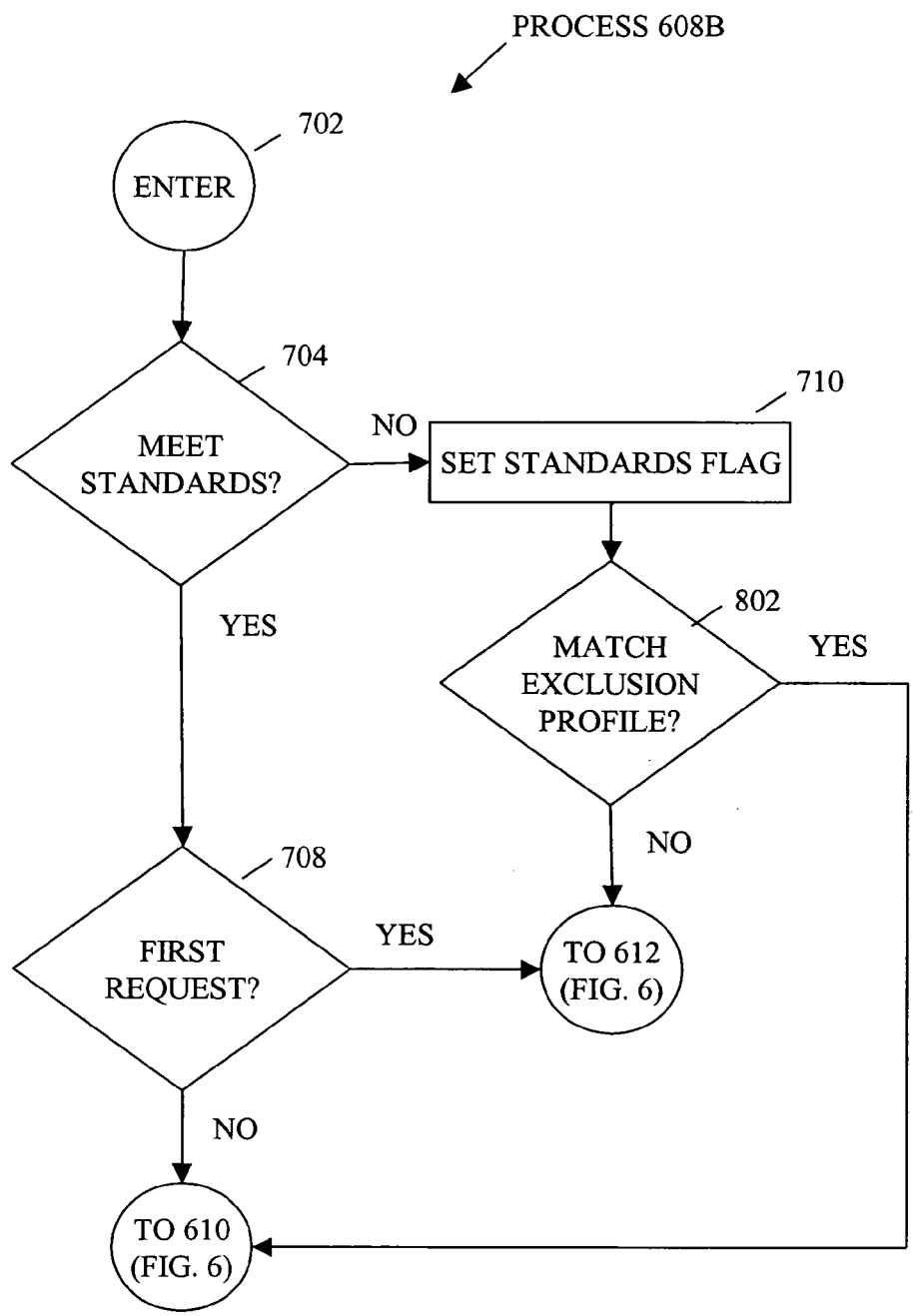
FIG. 8 illustrates a flow diagram of a host computer system process used in a SUSPICIOUS REQUEST check operation in accordance with another embodiment of the present invention.

FIG. 8 illustrates a flow diagram of a host computer system process 608B used in SUSPICIOUS REQUEST check operation 608 of process 600 in accordance with another embodiment of the present invention. Referring now to FIGS. 1-8 together, in the present embodiment, a request entry is added to request database 206: (1) upon a determination that the request does not meet one or more selected standards in standards list 208 and is not excluded from entry; or (2) upon a determination that the request is a first request. From ENTER operation 702, flow moves to MEET STANDARDS check operation 704.

In MEET STANDARDS check operation 704, analyzer module 204 analyzes the request to determine whether the request meets one or more selected standards in standards list 208 as earlier described with reference to FIG. 7. Upon a determination that the request does not meet the one or more selected standards, from MEET STANDARDS check operation 704, flow moves to SET STANDARDS FLAG operation 710.

In SET STANDARDS FLAG operation 710, analyzer module 204 sets a standards flag indicating that the request does not meet the one or more selected standards in standards list 208 as earlier described with reference to FIG. 7, and from SET STANDARDS FLAG operation 710, flow moves to a MATCH EXCLUSION PROFILE check operation 802.

In MATCH EXCLUSION PROFILE check operation 802, analyzer module 204 determines whether the request matches an exclusion profile entry listed in exclusion profile list 212. In one embodiment, exclusion profile list 212 includes a list of exclusion profile entries to be excluded from inclusion on request database 206.

In one embodiment, to determine whether the request matches an exclusion profile entry, analyzer module 204 generates a request ID based on the request and compares the request ID to the exclusion profile IDs listed as entries in exclusion profile ID field 502 of exclusion profile list 212. In one embodiment, the request ID is generated utilizing the same formatting method utilized in generating the exclusion profile IDs, for example, a hashing algorithm, such as an MD5 hash.

Upon a determination that the request matches an exclusion profile entry in exclusion profile list 212, the request is automatically defined as not suspicious. Thus, even though the request does not meet the one or more standards in standards list 208, the request is not determined to be suspicious, e.g., the request is excluded, and from MATCH EXCLUSION PROFILE check operation 802, flow exits process 608B and moves to RELEASE REQUEST operation 610 of process 600 as earlier described.

Upon a determination that the request does not match an exclusion profile entry in exclusion profile list 212, the request is not automatically defined as not suspicious. As the request does not meet the one or more standards in standards list 208 and is not excluded, the request is determined to be suspicious, and from MATCH EXCLUSION PROFILE check operation 802, flow exits process 608B and moves to ADD REQUEST ENTRY TO REQUEST DATABASE operation 612 of process 600 as earlier described.

Referring again to MEET STANDARDS check operation 704, upon a determination that the request meets the one or more selected standards in standards list 208, from MEET STANDARDS check operation 704, flow moves to FIRST REQUEST check operation 708.

In FIRST REQUEST check operation 708, analyzer module 204 determines whether the request matches an earlier request entry in request database 206 as earlier described with reference to FIG. 7. Upon a determination that the request matches an earlier request entry in request database 206, the request is not a first request. Thus, as the request meets the one or more standards in standards list 208 and is not a first request, the request is not suspicious, and from FIRST REQUEST check operation 708, flow exits process 608B and moves to RELEASE REQUEST operation 610 of process 600 as earlier described.

Alternatively, upon a determination that the request does not match an earlier request entry in request database 206, the request is a first request. In the present embodiment, a first request is automatically defined as suspicious, thus from FIRST REQUEST check operation 708, flow exits process 608B and moves to ADD REQUEST ENTRY TO REQUEST DATABASE operation 612 of process 600 as earlier described.

Figure 9:
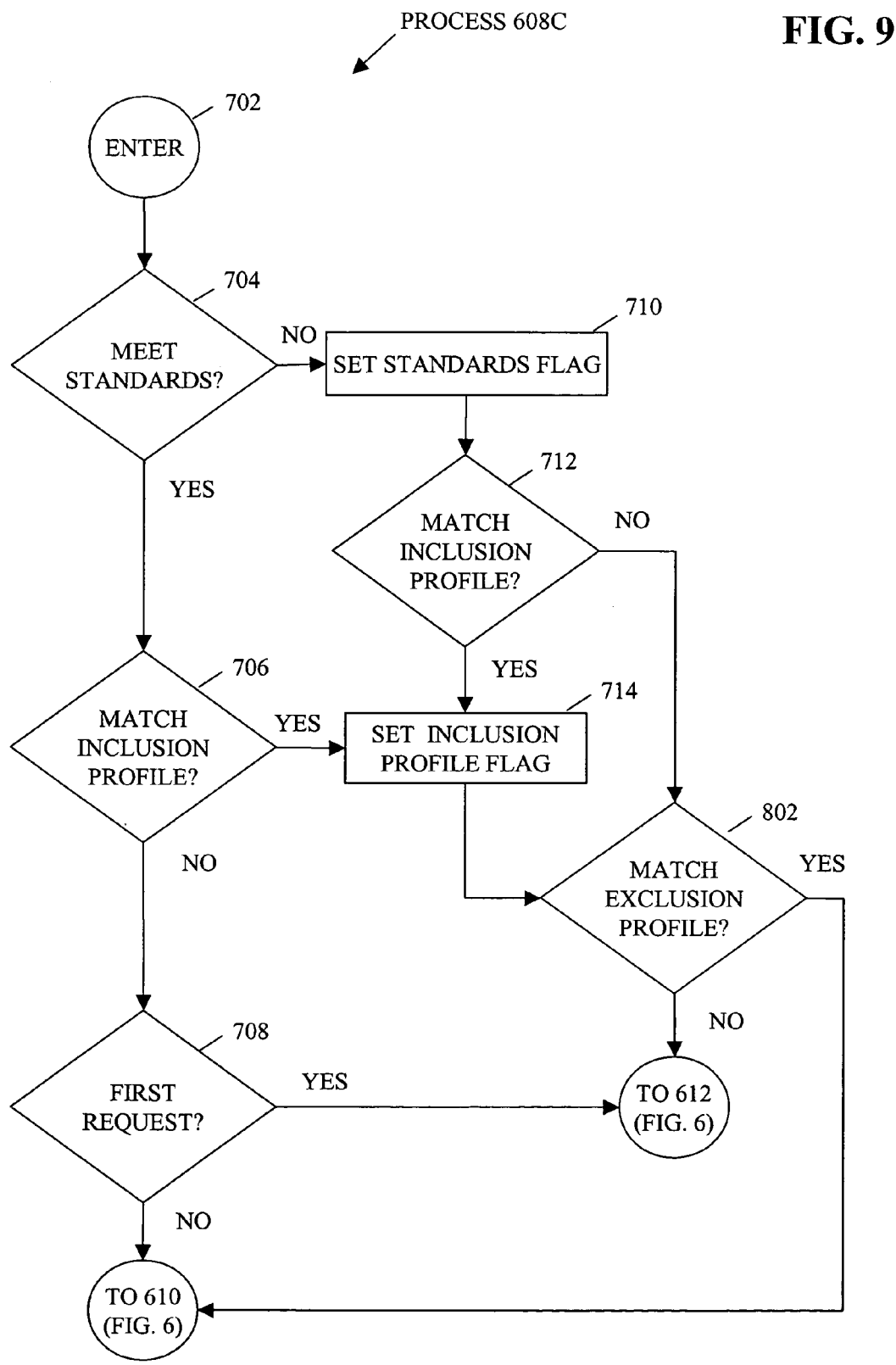
FIG. 9 illustrates a flow diagram of a host computer system process used in a SUSPICIOUS REQUEST check operation in accordance with another embodiment of the present invention.

FIG. 9 illustrates a flow diagram of a host computer system process 608C used in SUSPICIOUS REQUEST check operation 608 of process 600 in accordance with another embodiment of the present invention. In the present embodiment, a request entry is added to request database 206: (1) upon a determination that the request does not meet one or more selected standards in standards list 208 and is not excluded from entry; (2) upon a determination that the request matches an entry on the inclusive profile list and is not excluded from entry; or (3) upon a determination that the request is a first request. From ENTER operation 702, flow moves to MEET STANDARDS check operation 704.

In MEET STANDARDS check operation 704, analyzer module 204 analyzes the request to determine whether the request meets one or more selected standards in standards list 208 as earlier described with reference to FIG. 7. Upon a determination that the request does not meet the one or more selected standards, from MEET STANDARDS check operation 704, flow moves to SET STANDARDS FLAG operation 710.

In SET STANDARDS FLAG operation 710, analyzer module 204 sets a standards flag indicating that the request does not meet the one or more selected standards in standards list 208 as earlier described with reference to FIG. 7, and from SET STANDARDS FLAG operation 710, flow moves to MATCH INCLUSION PROFILE check operation 712.

In MATCH INCLUSION PROFILE check operation 712, analyzer module 204 determines whether the request matches an inclusion profile entry listed in inclusion profile list 210 as earlier described with reference to FIG. 7. Upon a determination that the request does not match an inclusion profile entry, from MATCH INCLUSION PROFILE check operation 712, flow moves to MATCH EXCLUSION PROFILE check operation 802.

In MATCH EXCLUSION PROFILE check operation 802, analyzer module 204 determines whether the request matches an exclusion profile entry listed in exclusion profile list 212 as earlier described with reference to FIG. 8. Upon a determination that the request matches an exclusion profile entry, the request is automatically defined as not suspicious. Thus, even though the request does not meet the one or more standards in standards list 208, the request is not determined to be suspicious, and from MATCH EXCLUSION PROFILE check operation 802, flow exits process 608C and moves to RELEASE REQUEST operation 610 of process 600 as earlier described.

Upon a determination that the request does not match an exclusion profile entry in exclusion profile list 212, the request is not automatically defined as not suspicious. As the request does not meet the one or more standards in standards list 208, the request is determined to be suspicious, and from MATCH EXCLUSION PROFILE check operation 802, flow exits process 608C and moves to ADD REQUEST ENTRY TO REQUEST DATABASE operation 612 of process 600 as earlier described.

Referring again to MATCH INCLUSION PROFILE check operation 712, alternatively, upon a determination that the request matches an inclusion profile entry, from MATCH INCLUSION PROFILE check operation 712, flow moves to SET INCLUSION PROFILE FLAG operation 714.

In SET INCLUSION PROFILE FLAG operation 714, analyzer module 204 sets an inclusion profile flag indicating that the request matches an inclusion profile entry in inclusion profile list 210 as earlier described with reference to FIG. 7, and from SET INCLUSION PROFILE FLAG operation 714, flow moves to MATCH EXCLUSION PROFILE check operation 802.

In MATCH EXCLUSION PROFILE check operation 802, analyzer module 204 determines whether the request matches an exclusion profile entry listed in exclusion profile list 212 as earlier described with reference to FIG. 8. Upon a determination that the request matches an exclusion profile entry, the request is automatically defined as not suspicious. Thus, even though the request does not meet the one or more standards in standards list 208 and matches an inclusion profile entry in inclusion profile 210, the request is not determined to be suspicious, and from MATCH EXCLUSION PROFILE check operation 802, flow exits process 608C and moves to RELEASE REQUEST operation 610 of process 600 as earlier described.

Alternatively, upon a determination that the request does not match an exclusion profile entry in exclusion profile list 212, the request is not automatically defined as not suspicious. As the request does not meet the one or more standards in standards list 208 and matches an inclusion profile entry in inclusion profile 210, the request is determined to be suspicious, and from MATCH EXCLUSION PROFILE check operation 802, flow exits process 608C and moves to ADD REQUEST ENTRY TO REQUEST DATABASE operation 612 of process 600 as earlier described.

Referring again to MEET STANDARDS check operation 704, upon a determination that the request meets the one or more selected standards in standards list 208, flow moves from MEET STANDARDS check operation 704 to MATCH INCLUSION PROFILE check operation 706.

In MATCH INCLUSION PROFILE check operation 706, analyzer module 204 determines whether the request matches an inclusion profile entry listed in inclusion profile list 210 as earlier described with reference to FIG. 7. Upon a determination that the request matches an inclusion profile entry in inclusion profile list 210, from MATCH INCLUSION PROFILE check operation 706, flow moves to SET INCLUSION PROFILE FLAG operation 714.

In SET INCLUSION PROFILE FLAG operation 714, analyzer module 204 sets an inclusion profile flag indicating that the request matches an inclusion profile entry in inclusion profile list 210 as earlier described with reference to FIG. 7, and from SET INCLUSION PROFILE FLAG operation 714, flow moves to MATCH EXCLUSION PROFILE check operation 802.

In MATCH EXCLUSION PROFILE check operation 802, analyzer module 204 determines whether the request matches an exclusion profile entry listed in exclusion profile list 212 as earlier described with reference to FIG. 8. Upon a determination that the request matches an exclusion profile entry in exclusion profile list 212, the request is automatically defined as not suspicious. Thus, even though the request matches an inclusion profile entry in inclusion profile list 210, the request is not determined to be suspicious, and from MATCH EXCLUSION PROFILE check operation 802, flow exits process 608C and moves to RELEASE REQUEST operation 610 of process 600 as earlier described.

Alternatively, upon a determination that the request does not match an exclusion profile entry in exclusion profile list 212, the request is not automatically defined as not suspicious. As the request matches an inclusion profile entry in inclusion profile list 210, the request is determined to be suspicious, and from MATCH EXCLUSION PROFILE check operation 802, flow exits process 608C and moves to ADD REQUEST ENTRY TO REQUEST DATABASE operation 612 of process 600 as earlier described.

Referring again to MATCH INCLUSION PROFILE check operation 706, upon a determination that the request does not match an inclusion profile entry, from MATCH INCLUSION PROFILE check operation 706, flow moves to FIRST REQUEST check operation 708.

In FIRST REQUEST check operation 708, analyzer module 204 determines whether the request matches a request entry in request database 206 as earlier described with reference to FIG. 7. Upon a determination that the request matches an earlier request entry in request database 206, the request is not a first request. Thus, as the request meets the one or more standards in standards list 208, does not match an inclusion profile entry in inclusion profile list 210, and is not a first request, the request is not suspicious, and from FIRST REQUEST check operation 708, flow exits process 608C and moves to RELEASE REQUEST operation 610 of process 600 as earlier described.

Alternatively, upon a determination that the request does not match an earlier request entry in request database 206, the request is a first request. In the present embodiment, a first request is automatically defined as suspicious, thus from FIRST REQUEST check operation 708, flow exits process 608C and moves to ADD REQUEST ENTRY TO REQUEST DATABASE operation 612 of process 600 as earlier described.

Thus, embodiments in accordance with the present invention intercept and stall requests issuing on a host computer prior to sending the request to a target computer systems. The requests are analyzed to determine whether the requests are suspicious. Requests determined to be suspicious are added as request entries to a request database. Each time a request entry is added to the request database a determination is made whether malicious code activity is detected on the host computer system. Upon a determination that malicious code activity is detected, a notification of the malicious code detection is generated and protective actions are implemented, such as terminating the request. Requests not determined to be suspicious or to indicate malicious code activity are released for sending to the target computer systems.

Herein, although detection application 106 is referred to as an application, this is illustrative only. Detection application 106 should be capable of being called from an application or from the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration and a network system, an embodiment of the present invention may be carried out using any suitable hardware configuration involving a personal computer, a workstation, a portable device, or a network of computer devices. Other network configurations, e.g., peer-to-peer, web-based, intranet, internet network configurations, can be used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, detection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102A and/or server system 130 is a portable computer, a workstation, a two-way pager, a cellular telephone, a digital wireless telephone, a personal digital assistant, a server computer, an Internet appliance, or any other device that includes components that can execute the detection functionality in accordance with at least one of the embodiments as described herein. Similarly, in another embodiment, host computer system 102A and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionalities of detection application 106 in accordance with one embodiment of present invention can be implemented in a wide variety of computer system configurations. In addition, functionalities of detection application 106 could be stored as different modules in memories of different devices. For example, detection application 106 could initially be stored in server system 130, and then as necessary, a portion of detection application 106 could be transferred to host computer system 102A and executed on host computer system 102A. Consequently, part of the detection functionalities would be executed on processor 132 of server computer system 130, and another part would be executed on processor 108 of host computer system 102A. In view of this disclosure, those of skill in the art can implement various embodiments of the present invention in a wide-variety of physical hardware configurations using an operating system and computer programming language of interest to the user.

In yet another embodiment, detection application 106 is stored in memory 136 of server system 130. Detection application 106 is transferred over network 124 to memory 112 in host computer system 102A. In this embodiment, network interface 138 and I/O interface 110 would include analog modems, digital modems, or a network interface card. If modems are used, network 124 includes a communications network, and detection application 106 is downloaded via the communications network.

Further, although the various operations of the processes described herein with respect to processes 600, 608A, 608B, and 608C, are presented in an exemplary order, other orders are possible.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
stalling a request on a host computer system prior to sending the request to a target computer system;
determining whether the request is suspicious;
wherein upon a determination that the request is not suspicious, releasing the request; and
wherein upon a determination that the request is suspicious, adding a request entry to a request database, the request entry identifying the request,
generating a counter value associated with the request entry,
determining whether the counter value meets a counter value threshold, and
wherein upon a determination that the counter value meets the counter value threshold, determining that malicious code activity is detected.

2. The method of claim 1, further comprising:
wherein upon a determination that malicious code activity is detected, generating a notification that malicious code activity is detected; and
implementing one or more protective actions.

3. A method comprising:
intercepting a request on a host computer system;
stalling the request;
determining whether the request is suspicious,
wherein upon a determination that the request is suspicious, adding a request entry representative of the request to a request database, and
determining whether malicious code activity is detected on the host computer system based upon the request entry; and
wherein upon a determination that malicious code activity is detected on the host computer system, generating a notification that malicious code activity is detected on the host computer system, and
implementing one or more protective actions.

4. The method of claim 3, further comprising:
wherein upon a determination that the request is not suspicious, releasing the request.

5. The method of claim 3, further comprising:
wherein upon a determination that malicious code activity is not detected on the host computer system, releasing the request.

6. The method of claim 3, wherein the implementing one or more protective actions comprises:
terminating the request.

7. The method of claim 3, wherein the request is an HTTP GET request.

8. The method of claim 3, wherein the intercepting a request on a host computer system utilizes a local proxy mechanism.

9. The method of claim 3, wherein the intercepting a request on a host computer system occurs at the application level.

10. A method comprising:
intercepting a request on a host computer system;
stalling the request; and
determining whether the request is suspicious,
wherein upon a determination that the request is suspicious, adding a request entry representative of the request to a request database, and
determining whether malicious code activity is detected on the host computer system based upon the request entry,
wherein the determining whether malicious code activity is detected on the host computer system based upon the request entry further comprises:
generating a counter value associated with the request entry; and
determining whether the counter value meets a counter value threshold,
wherein upon a determination that the counter value does not meet the counter value threshold, determining that malicious code activity is not detected on the host computer system, and wherein upon a determination that the counter value meets the counter value threshold, determining that malicious code activity is detected on the host computer system.

11. A malicious code detection device comprising:

an intercept module, the intercept module for intercepting a request issuing on a host computer system prior to the sending of the request from the host computer system to a target computer system;

an analyzer module coupled to the intercept module, the analyzer module for determining whether the request is suspicious utilizing at least a standards list, the analyzer module further for adding a request entry corresponding to the request to a request database when the request is determined as suspicious, the analyzer module further for determining whether malicious activity is detected on the host computer system based on whether a counter value associated with a request entry meets a counter value threshold;

a request database coupled to the analyzer module, the request database including one or more request entries, each of the one or more request entries identifying a request determined to be suspicious; and a standards list coupled to the analyzer module, the standards list including selected standards for use in determining whether the request is suspicious.

12. The malicious code detection device of claim 11, further comprising:

an inclusion profile list coupled to the analyzer module.

13. The malicious code detection device of claim 11, further comprising:

an exclusion profile list coupled to the analyzer module.

14. The malicious code detection device of claim 11, further comprising a memory area coupled to the intercept module and the analyzer module.

15. The malicious code detection device of claim 11, wherein the intercept module includes an interception mechanism for intercepting a request.

16. A computer program product comprising a computer-readable medium storing computer program code for a method comprising:

stalling a request on a host computer system prior to sending the request to a target computer system;

determining whether the request is suspicious;

wherein upon a determination that the request is not suspicious, releasing the request; and wherein upon a de termination that the request is suspicious, adding a request entry to a request database, the request entry identifying the request, generating a counter value associated with the request entry, determining whether the counter value meets a counter value threshold, and wherein upon a determination that the counter value meets the counter value threshold, determining that malicious code activity is detected.

17. The computer program product of claim 16, the method further comprising:

wherein upon a determination that malicious code activity is detected, generating a notification that malicious code activity is detected; and implementing one or more protective actions.

18. A computer program product comprising a computer-readable medium storing computer program code for a method comprising:

intercepting a request on a host computer system;

stalling the request;

determining whether the request is suspicious, wherein upon a determination that the request is suspicious, adding a request entry representative of the request to a request database, and determining whether malicious code activity is detected on the host computer system based upon the request entry; and wherein upon a determination that malicious code activity is detected on the host computer system, generating a notification that malicious code activity is detected on the host computer system, and implementing one or more protective actions.

* * * * *

UNITED STATES PATENT AND TRADEMARK OFFICE
CERTIFICATE OF CORRECTION

| | | |
|---|---|---|
| PATENT NO. | : 7,325,185 B1 | Page 1 of 1 |
| APPLICATION NO. | : 10/633907 | |
| DATED | : January 29, 2008 | |
| INVENTOR(S) | : Peter Szor | |

It is certified that error appears in the above-identified patent and that said Letters Patent is hereby corrected as shown below:

In Column 20, Line 6, in Claim 16, after "upon a", replace "de termination" with --determination--.

Signed and Sealed this

Third Day of June, 2008

JON W. DUDAS
*Director of the United States Patent and Trademark Office*